United States Patent

Caporali et al.

[15] 3,691,224

[45] Sept. 12, 1972

[54] PROCESS FOR THE CONTINUOUS PRODUCTION OF OLEFINICALLY UNSATURATED NITRILES

[72] Inventors: Giorgio Caporali; Natale Ferlazzo; Nicola Giordano, all of Milan, Italy

[73] Assignee: Montecatini Edison S.P.A., Milan, Italy

[22] Filed: Aug. 10, 1970

[21] Appl. No.: 62,631

Related U.S. Application Data

[63] Continuation-in-part of Ser. No. 632,635, April 21, 1967, abandoned.

[52] U.S. Cl. ..........260/465.3, 260/604 R, 23/288 B, 23/288 S
[51] Int. Cl. ..C07c 121/32, C07c 47/22, C07c 45/10
[58] Field of Search....................................260/465.3

[56] References Cited

UNITED STATES PATENTS

| | | |
|---|---|---|
| 3,472,892 | 10/1969 | Callahan et al.........260/465.3 |
| 3,501,517 | 3/1970 | Hughes et al.......260/465.3 X |
| 3,230,246 | 1/1966 | Callahan et al.........260/465.3 |
| 3,142,697 | 7/1964 | Jennings et al. ........260/465.3 |
| 3,200,084 | 8/1965 | Callahan et al.....260/465.3 X |
| 3,232,978 | 2/1966 | Yasuhara et al........260/465.3 |
| 3,253,014 | 5/1966 | McDaniel et al. ......260/465.3 |
| 3,383,329 | 5/1968 | Young et al. ........260/465.3 X |
| 3,226,422 | 12/1965 | Sennewald et al......260/465.3 |
| 3,200,141 | 8/1965 | Milberger...............260/465.3 |
| 3,427,343 | 2/1969 | Callahan et al.........260/465.3 |

*Primary Examiner*—Joseph P. Brust
*Attorney*—Stevens, Davis, Miller & Mosher

[57] ABSTRACT

A process for the continuous production of unsaturated aldehydes or unsaturated nitriles by continuously reacting in vapor phase, at elevated temperature and in the presence of a solid oxidation catalyst, a monoolefin with either oxygen or oxygen together with ammonia, the said reaction being conducted in a reactor provided with at least one cyclone equipped with exhaust means for the recovery of catalyst continuously mechanically conveyed thereto by the continuously reacting gases and the said catalyst being continuously maintained in fluidized state within the said reactor and being continuously separated in the cyclone and continuously recycled to the fluidized bed via the said exhaust means, with the said exhaust means being continuously charged with either oxygen or an oxygen-containing gas, whereby there is formed continuous oxidative catalyst regenerating zone within the reactor.

4 Claims, No Drawings

3,691,224

PROCESS FOR THE CONTINUOUS PRODUCTION OF OLEFINICALLY UNSATURATED NITRILES

CROSS REFERENCE TO RELATED APPLICATION

This application is a continuation-in-part of our copending application, Ser. No. 632,635 filed Apr. 21, 1967 now abandoned.

BACKGROUND OF THE INVENTION

The present invention relates to the synthesis of unsaturated aldehydes or unsaturated nitriles by reaction in vapor phase at high temperature of olefins with oxygen or of ammonia with oxygen, in the presence of oxidation catalysts, and is particularly applicable to the synthesis of acrolein or acrylonitrile from propylene and of methacrolein or methacrylonitrile from isobutene.

More particularly, the present invention relates to an improved process by which the activity of the catalyst is maintained uniformly high through time due to a method of continuous oxidative regeneration of the catalyst itself.

It is known in the art that the oxidation catalysts used for the reaction of monoolefins with ammonia and oxygen may diminish in activity during their use and it is also known in the art that this activity may be recovered through reactivation consisting of treatment of the catalyst with air at high temperatures. This system exhibits, however, the drawback of compelling one to interrupt the reaction, moreover, even while the reaction is in progress there arises in time a variation in results.

Improved processes have been proposed which substantially consist of carrying out the reaction in the presence of an excess of oxygen, so as to avoid the insurgence of said drawbacks.

These methods are definitely better than that previously described, however, in order to be fully effective, they involve a continuous regulation of the quantity of oxygen used and, in practice, they require a considerable excess thereof. Since the oxygen is normally used in the form of air, a considerable excess of it involves the presence of great quantities of nitrogen which acts both as a diluent for the reactants thus reducing the reaction speed, as well as a diluent for the reaction products, thus making their recovery more difficult and, at any rate, requires reactors of greater dimensions. Furthermore, even using said excess of oxygen, it is possible that in some parts of the reactor the catalyst will find itself in a condition of insufficient oxidation.

Therefore, an object of this invention is that of providing a process that will preserve the activity of the catalysts used in the oxidation and ammoxidation of monoolefins at a uniformly high level through time.

Another object of this invention is that of eliminating the above mentioned drawbacks through a process that will neither require interruptions of the reaction nor necessitate too great an excess of oxygen in the reaction mixture that is fed to the reactor.

These and other objects are achieved when the catalyst or a part thereof is continuously subjected to a regenerating oxidation treatment.

THE INVENTION

This invention comprises creating within the reactor a continuous regenerating zone for the catalyst by means of a continuous treatment at high temperature of part of the catalyst with oxygen or with oxygen-containing gases.

The invention is applied when the reaction is conducted with a catalyst maintained in the state of a fluidized or dispersed bed. It is known that in this case the reactor is constituted essentially by a vertical cylindrical vessel; this latter is provided at its bottom with an inlet for the reaction mixture and of a medium for dispersing the reactants inside the catalytic mass, consisting of a platelike distributor that serves contemporaneously as a carrier for the catalytic bed.

The lower part of the reactor, above the supporting plate, is occupied for part of its height by the catalyst and in that zone there are generally also placed suitable means for eliminating the reaction heat.

In the top part of the reactor there are placed one or more cyclones, in parallel and/or in series, which allow recovery of the particles of catalyst that the gaseous mixture drags out of or expels from the catalytic bed.

After having passed through the cyclones, the gaseous mixture leaves the reactor and proceeds towards the collection system where the products gather, while the catalyst, that is separated within the cyclones is carried back to the catalytic bed through an exhaust tube which reaches from the lower end of the cyclones to a certain point into the catalytic bed itself.

The lower end of the exhaust tube of the cyclones may be opened or closed by valves of a type known to those skilled in the art of this particular technical field.

A part of the gaseous mixture may rise along the same exhaust tube, when its lower end is open.

It has now been found that in the exhaust tube of the cyclones the catalyst occupies a height substantially greater than the height of the catalytic bed thereby establishing within this continuously fluidized bed a zone of continuously enhanced fluidity with respect to the conditions of fluidity existing in the fluidized bed. Therefore, inside of this exhaust tube the contact time of the gaseous mixture with the catalyst will be much longer than that which is attained in the continuously fluidized catalytic bed and, thus, there will be a higher conversion of reactants with less selectivity. Consequently, there is likewise established a zone of continuously enhanced fluidity with respect to the conditions of fluidity existing in the fluidized bed. In addition, the catalyst while in the zone of enhanced fluidity is in a state of relatively greater reduction by reason of its relatively longer contact time with the gaseous reactants. Moreover, there also takes place a highly reduced dispersion of the reaction heat in comparison to that which takes place in the catalytic bed.

In point of fact, it has been observed that the catalyst emanating from the exhaust of the cyclones is in a highly reduced condition and exhibits reduced catalytic activity.

The drawbacks that derive from the peculiar conditions existing in the exhaust tube of the cyclones become particularly evident when one bears in mind that in industrial practice the frequency with which the entire catalyst passes through the cyclones is usually comprised between 2 and 0.5 times per hour.

Similar unfavorable conditions also occur when the exhaust tube of the cyclones is closed by a valve.

In such a case the gaseous atmosphere in which the catalyst finds itself will be that flowing from the reactor, that is, an atmosphere poor in oxygen and predominantly constituted by reducing organic products, readily absorbable, wherefore there ensues partial deactivation of the catalyst.

It has now been found that the immediately above serious drawbacks may be completely eliminated, if into the exhaust tube of the cyclones and hence into the zone of enhanced fluidity and reactivity occurring therein, there is continuously supplied a catalyst regenerative gas consisting of oxygen or oxygen containing gases, other than oxygen of reaction, in an amount sufficient to insure continuous oxidative regeneration of the catalyst. In this way an oxidative continuously regenerating zone for the catalyst is thus formed operating at a temperature substantially equal to that of the catalytic bed, whereby the catalyst that is returning from the cyclones to the catalytic bed will find itself wholly regenerated and highly activated and consequently will contribute to maintaining at a high level the activity of the entire catalytic bed.

The present invention consists, thus, in introducing oxygen or oxygen-containing gases, other than oxygen of reaction, into the exhaust tube of the cyclones, through which the catalyst mechanically dragged by the reacting gases is separated and recycled into the catalytic bed, so that a zone of continuous oxidative regeneration is formed within the fluidized reaction bed, in a particular zone of continuously enhanced fluidity and reactivity with respect to the conditions of fluidity and reactivity existing in the fluidized bed.

It appears that in addition to solving the serious problems associated with employment of interiorly disposed cyclone exhaust tubes for recycling recovered catalyst, the present invention derives significant advantages from conducting the oxidative catalyst regeneration step in the aforedescribed zone of enhanced fluidity and reactivity. For example, the greater state of fluidization within the exhaust tube results in increased void space between catalyst particles allowing more intimate contact between the catalyst and the catalyst regenerative gas. Similarly, an increase in contact time therebetween is provided as a result of the enhanced fluidity within the zone. At the same time, because the recovered catalyst is in a state of relatively greater reduction, the oxidative regeneration reaction procedes with maximum efficiency.

In another aspect, the present invention obviates the necessity of carefully regulating the quantity of oxygen supplied in the reactant stream to insure a sufficient excess to accomplish in situ catalyst regeneration in the catalyst bed. Likewise, the present invention makes it unnecessary to provide the considerable excess of regenerative gas required in prior processes because in the instant process only so much oxygen as is necessary to completely regenerate the recycled, highly reduced, catalyst is needed. And since, as discussed above, the entire quantity of catalyst passes through the cyclones between 2 and 0.5 times per hour, the present invention insures complete regeneration of the catalyst with no waste of catalyst regenerative gas.

In general, the quantity of oxygen or oxygen-containing gases which is fed into each single exhaust tube is calculated in such manner that its linear velocity, calculated under average temperature and pressure conditions occurring inside the tube and with respect to the area of the inertial section of the tube when it is not occupied by the catalyst, be comprised between the velocity of minimum fluidization of the catalyst and the dragging velocity of the catalyst itself. In practice, it has been found that velocities comprised between 0.5 and 30 cm/sec. are quite convenient, in as much as they permit the fluidization of the catalyst, which fluidization facilitates the fall of the catalyst along the tube, and also improves the thermal exchange inside the tube without creating problems of drag.

Since the cross-section of the exhaust tubes of the cyclones is very small with respect to the cross-section of the reactor, the quantity of oxygen or oxygen-containing gases fed in according to this invention practically does not alter the total quantities of gases in reaction and does not lead to the known drawbacks of dilution of the products. Thus, the products of reaction may be continuously separated and recovered in substantially undiluted state.

Furthermore, the quantities of oxygen indicated above are quite sufficient for effecting complete regeneration of the catalyst that passes through the exhaust tube of the cyclone.

The regeneration of the catalyst that passes through the exhaust tube of the cyclone is generally carried out under temperature conditions substantially equal to those of reaction temperature; it is, however, possible to carry out the regeneration at a temperature higher than that of the reaction, for instance, by feeding in oxygen or oxygen-containing gases, preheated at such a temperature that this may in turn heat the catalyst with which it comes into contact.

According to this invention, there may be introduced into the exhaust tubes of the cyclones oxygen or oxygen-containing mixtures having an oxygen content higher than about 3 percent as, for instance, air or air enriched by oxygen. It will of course be appreciated that the supply of catalyst regenerative gas cannot advantageously be provided by the gaseous reactant stream because of the contemporaneous presence of the highly reductive reactants, and similarly, to supply the necessary excess of oxygen in the reactant stream would result in an economic waste of the bulk of such additional supply, and the necessity of providing equipment of increased size and capacity, particularly where air is employed as the oxygen-supplying gas.

Generally use is made of air which is already available at plant pressure and which, in general, affords quite satisfactory results and is economically more convenient.

The pressure, which is equal to the reaction pressure and which in industrial practice is usually higher than atmospheric pressure, facilitates the regenerative process.

In order to further illustrate the present invention and the advantages thereof, the following specific examples are given, it being understood that the same are merely intended as illustrative and not limitative.

EXAMPLE 1

Into a reactor of 0.6 m diameter a catalyst was loaded (as per Italian patent No. 682,880) constituted by 25 percent by weight of $Te_4Ce_5Mo_{12}O_{54}$ deposited on 75 percent by weight of a carrier constituted by microspheroidal silica.

From the bottom of the reactor, through a distribution plate, there was fed a gaseous mixture consisting of propylene, ammonia and air in molar ratios of: 1:1, 1:13; the contact time of this mixture with the catalyst was 5.5 seconds.

The reaction temperature was 440° C., and the pressure amounted to 1.8 at.

In the upper part of the reactor there were placed two cyclones joined in series, each one provided with its own exhaust tube dipped into the catalytic bed and lacking bottom valves.

When operated under standard conditions, that is, without applying this invention, the following results are obtained:

| % conversion | net yield % | | gross yield % |
|---|---|---|---|
| of propylene 80% | acrylonitrile 74% | carbon oxides 17% | acrylonitrile 59.2% |

After a certain reaction time these results will be considerably lower. The examination of the catalyst through a standard activity test showed that it was partially deactivated while the catalyst that was in the exhaust tubes of the cyclones was even less active.

When, according to this invention, in each exhaust tube of the cyclones air pre-heated at reaction temperature was fed in and in such quantity that it ascended the exhaust tube at a linear velocity of from 8–20 cm/sec., the following constant results were found for a duration of over 1,000 hours of continuous operation:

| Conversion % | Net Yield % | | Gross Yield % |
|---|---|---|---|
| of propylene 84.0% | acrylonitrile 77.4% | carbon oxides 15.2% | acrylonitrile 65.0% |

The examination of the catalyst showed that it possessed high activity and no difference whatsoever was found between samples drawn from the catalytic bed and samples drawn from the exhaust tubes of the cyclones.

EXAMPLE 2

In the same reactor described in Example 1, the bottom ends of the cyclones, which in the preceeding tests were open, were modified by fitting them with a "trickle valve." Also in this case air was fed in such a quantity that its velocity in the exhaust tube was 6 cm/sec.

Under the same reaction conditions as those described previously, but with a contact time of 6.6 seconds, the following constant results were obtained for long periods of continuous operation:

| Conversion% | Net Yield% | | Gross Yield % |
|---|---|---|---|
| of propylene 86% | acrylonitrile 78.5% | carbon oxides 15.1% | acrylonitrile 67.5% |

Also in this case the catalyst, both the one drawn from the catalytic bed, as well as that drawn from the exhaust of the cyclones, showed a homogeneous aspect and had a high degree of activity.

Similar results have been obtained in the preparation of methacrylonitrile from isobutene, ammonia and oxygen, and in the preparation of acrolein and methacrolein from the respective olefins and oxygen.

What is claimed is:

1. In a process for continuously producing a nitrile selected from the group consisting of acrylonitrile and methacrylonitrile comprising continuously reacting, at elevated temperatures and in vapor phase, an olefin selected from the group consisting of propylene and isobutylene, oxygen and ammonia, said reaction being conducted in a continuously fluidized bed of solid oxidation catalyst, the improvement which comprises in combination (1) establishing within the said continuously fluidized bed a zone of continuously enhanced fluidity and reactivity with respect to the conditions of fluidity and reactivity existing in the continuously fluidized bed, and from which bed the products of reaction are continuously separated in substantially undiluted state, and wherein such zone the catalyst is in a state of relatively greater reduction by reason of its relatively longer contact time with the aforesaid gaseous reactants, which reactants themselves are in a state of higher conversion and less selectivity in the said zone, and (2) continuously supplying a catalyst regenerative gas consisting essentially of oxygen other than oxygen of reaction to said zone of enhanced fluidity and reactivity in an amount sufficient to insure continuous oxidative regeneration of the said catalyst.

2. The process as defined by claim 1, wherein the oxygen is provided by means of a stream of air.

3. The process as defined by claim 2, wherein the zone of enhanced fluidity and reactivity is maintained at a temperature at least as great as the reaction temperature.

4. The process as defined by claim 1, wherein the catalyst regenerative gas is supplied in such quantity that its velocity is between the velocity of minimum fluidization and the drag velocity of the catalyst particles within the zone of enhanced fluidity and reactivity.

* * * * *